United States Patent [19]

Tajiri et al.

[11] Patent Number: 5,341,652
[45] Date of Patent: Aug. 30, 1994

[54] AIR-CONDITIONING SYSTEM FOR VEHICLE

[75] Inventors: Akihiro Tajiri; Yoshihko Hotta, both of Wako, Japan

[73] Assignee: Honda Giken Kogyo Kabushiki Kaisha, Tokyo, Japan

[21] Appl. No.: 963,429

[22] Filed: Oct. 19, 1992

[30] Foreign Application Priority Data

Oct. 17, 1991 [JP] Japan .................. 3-296648

[51] Int. Cl.$^5$ ........................... B60H 1/00
[52] U.S. Cl. ........................... 62/244; 62/265; 454/141; 165/42
[58] Field of Search ........... 62/498, 239, 244, 265; 454/141; 165/42

[56] References Cited

U.S. PATENT DOCUMENTS

| | | | |
|---|---|---|---|
| 2,077,974 | 4/1937 | Wishart | 165/42 |
| 2,264,848 | 12/1941 | Kahl | 62/324.1 |
| 3,595,029 | 7/1971 | Lende, Jr. | 62/244 |
| 3,731,729 | 5/1973 | Beatenbough et al. | 165/16 |
| 3,973,620 | 8/1976 | Stringer | 165/42 |
| 4,098,093 | 7/1978 | Czyl | 62/243 |
| 4,307,575 | 12/1981 | Popinski | 62/148 |
| 4,641,502 | 2/1987 | Aldrich et al. | 62/244 |

FOREIGN PATENT DOCUMENTS 55-8588  1/1980  Japan .
60-179322 9/1985 Japan .

OTHER PUBLICATIONS

Translation of Relevant Part of JP Nos. 55-8588 and 60-179322.

*Primary Examiner*—Henry A. Bennet
*Assistant Examiner*—William C. Doerrler
*Attorney, Agent, or Firm*—Lyon & Lyon

[57] ABSTRACT

A vehicle air-conditioning system includes three separate chambers formed by partitions. An interior heat exchanger is disposed in the first chamber for heat exchange with air introduced into the first chamber, and first chamber has an inside-air introduction port for admitting air from the vehicle passenger compartment into the first chamber and an air discharge port for discharging air into the compartment. An exterior heat exchanger is disposed in the second chamber for heat exchange with air introduced into the second chamber, and second chamber has an open-air introduction port for admitting air from outside of the vehicle into the second chamber and an air discharge port for discharging the air to outside of the vehicle. A compressor is mounted in communication with one of two refrigerant pipes for compressing a refrigerant, the two refrigerant pipes being adapted to circulate the refrigerant between the interior and exterior heat exchangers, and a depressurizing means is mounted in the other refrigerant pipe for depressurizing the refrigerant flowing between the interior and exterior heat exchangers. The compressor is disposed in the third chamber which is partitioned from the first and second chambers and the vehicle passenger compartment.

29 Claims, 10 Drawing Sheets

AIR-CONDITIONING SYSTEM FOR VEHICLE

BACKGROUND OF THE INVENTION

1. Field of the Invention

The present invention relates to an air-conditioning system in a vehicle, and particularly, to an air-conditioning system for an electric vehicle, comprising a heat pump type system having an interior heat exchanger and an exterior heat exchanger, so that air-cooling and heating are conducted by circulating a refrigerant between these interior and exterior heat exchangers while producing a change in phase between gas and liquid phases.

2. Description of the Prior Art

In general, an air-cooling system in a vehicle is comprised of an evaporator as an interior heat exchanger for heat exchange with air supplied into a passenger compartment, a condenser as an exterior heat exchanger for heat exchange with the open air taken from the outside of the vehicle, a compressor for compressing a refrigerant flowing from the evaporator to the condenser, and a depressurizing means such as an expansion valve for depressurizing the refrigerant flowing from the condenser to the evaporator.

In such air-cooling system, a refrigerating cycle is carried out in the following manner: first, a gas phase refrigerant compressed by the compressor is passed at a high temperature and a high pressure into the condenser. The open air is blown through the condenser by a cooling fan, so that the refrigerant is cooled and liquefied by such open air. The liquefied high pressure refrigerant is then depressurized by the expansion valve and fed to the evaporator. In this evaporator, the refrigerant is vaporized by absorbing heat from the surroundings. Thus, if air is introduced from the outside of the vehicle or from the passenger compartment and supplied into the compartment through the evaporator, such air is cooled to effect the cooling of the compartment. Then, the vaporized refrigerant is fed again to the compressor, where it is compressed.

The complete air-conditioning for a vehicle with an internal combustion engine is constructed by a combination of a vapor-compressing type cooling system for performing such a refrigerating cycle and a separate heater utilizing engine-cooling water.

Recently, it has been increasingly proposed to employ a heat pump system for the entire air-conditioning for the vehicle, as described in, for example, Japanese Patent Application Laid-open No. 17932285. An interior heat exchanger and an exterior heat exchanger are mounted in such a heat pump type air-conditioning system, so that the air-cooling is carried out by circulating a refrigerant between these heat exchangers in the same manner as in the above-described refrigerating cycle. The air heating is carried out by changing-over the direction of flow of the refrigerant and reversing the refrigerating cycle so as to release heat from the interior heat exchanger.

With such a heat pump type air-conditioning system, heat is absorbed from the open air to provide the air-heating and hence, the start of the air-heating begins immediately without waiting for the engine cooling water to become heated. Such heat pump type air-conditioning is also applicable to an electromobile equipped with no internal combustion engine.

In this way, the interior and exterior heat exchangers are used in either mode of operation of the vapor-compressing or heat pump type of air-conditioning. The interior heat exchanger is disposed inside the passenger compartment, because it provides heat exchange with the air supplied into the compartment. The exterior heat exchanger normally is disposed adjacent a radiator within an engine room located at the front end of the vehicle body, which makes it easy to supply air from outside of the vehicle, because it provides heat exchange with the open air. Usually, the engine room in which the exterior heat exchanger is placed is partitioned, by a dashboard, from the compartment in which the interior heat exchanger is placed.

In the prior art air-conditioning for the vehicle, the compressor is disposed within the engine room, because it is driven by the internal combustion. The exterior heat exchanger is also disposed within the engine room, as described above. In other words, the exterior heat exchanger and the compressor are disposed in the same chamber, as also described in the above-described patent.

However, the inside of the engine room is heated to a high temperature by the generation of heat from the engine and the like. The compressor itself also generates heat. For this reason, if the exterior heat exchanger is placed in the same chamber as are the heat generating sources such as the engine and the compressor, it is subjected to radiant heat from these heat generating sources. In addition, the cooling efficiency of the compressor is reduced and hence, when the refrigerant is compressed to a predetermined pressure by the compressor, it is heated more than necessary. Therefore, in order to conduct the air-cooling operation, it is necessary to use an exterior heat exchanger of a larger capacity to exhibit an increased cooling capability.

This will be described with respect to a Mollier diagram. The above-described refrigerating cycle is as shown in FIG. 10. More specifically, if the refrigerant is compressed by the compressor, the temperature and pressure of the refrigerant are changed from a point a to a point b in FIG. 10. They are changed from the point b to a point c in FIG. 10 by releasing heat from the exterior heat exchanger. Further, they are changed from the point c to a point d in FIG. 10 by depressurization of the refrigerant by the expansion valve. They are returned from the point d to the point a by absorption of heat by the refrigerant through the interior heat exchanger.

During this time, the compressor is not sufficiently cooled because the temperature of the air flowing around the compressor is higher, and hence, when the refrigerant is compressed to the predetermined pressure, the temperature of the refrigerant is at temperature at a point b' higher than the point b. Therefore, in order to lower the temperature of the refrigerant down to the point c, a corresponding increased capacity is required for the exterior heat exchanger. Moreover, the efficiency of the exterior heat exchanger is reduced by reception of radiant heat from the compressor, engine and the like and hence, it is necessary to further increase the capacity of the exterior heat exchanger. Additionally, the compressor performs additional work in raising the temperature of the refrigerant up to the point b' and therefore, the efficiency of the compressor itself is also reduced.

The energy consumed during air-cooling conducted for the air-conditioning of the vehicle is extremely large and a problem, particularly in the case of an electromobile, wherein the electrical power quantity is limited. For this reason, when the electric power quantity is consumed by the air-cooling, the travellable distance of the electric vehicle may be shortened. Thus, improvement in the air-cooling efficiency is an important consideration.

SUMMARY OF THE INVENTION

The present invention has been accomplished with such circumstances in view, and it is an object of the present invention to provide an air-conditioner system which has an improved cooling efficiency and which can be used in various operating modes.

To achieve this object, according to the present invention, the interior and exterior heat exchangers are disposed in first and second chambers partitioned from each other, and the compressor is in an independent third chamber partitioned from the first and second chambers and also from the motor and passenger compartments.

It is desirable that the third chamber is provided with a cooling-air intake port capable of opening and closing for admitting the open air for cooling the compressor, and a heat discharge port capable of opening and closing for discharging the warm air from the third chamber. Partitions for partitioning the first, second and third chambers from one another are provided with ports capable of opening and closing and capable of putting the first, second and third chambers into and out of communication with one another as required. Further, the inside-air introduction port and the air discharge port provided in the first chamber and the open-air introduction port and the air discharge port provided in the second chamber can also selectively be opened and closed.

The air-conditioning system can be used as a heat pump type by using a reversible depressurizing means and providing a switchover means for switching-over the direction of flow of the refrigerant.

The influence of radiant heat from the compressor exerted on the exterior heat exchanger is eliminated by the disposition of the compressor in the independent third chamber, leading to an improved efficiency of the exterior heat exchanger. In addition, the compressor is cooled efficiently by permitting cooling air to flow through the third chamber, leading to an improved efficiency of the compressor itself. Therefore, the air-conditioning for a vehicle has a high air-cooling efficiency.

By the ability to put the chambers into and out of communication with one another and by constructing the air-conditioning system as a heat pump type, the air-conditioning system can be used in various operating modes such as air-cooling and heating, ventilating, dehumidifying and ice-thawing or defrosting modes.

The above and other objects, features and advantages of the present invention will become apparent from the following description of the preferred embodiment, taken in conjunction with the accompanying drawings.

DESCRIPTION OF THE PREFERRED EMBODIMENT

The present invention will now be described by way of preferred embodiments.

Figure 1:
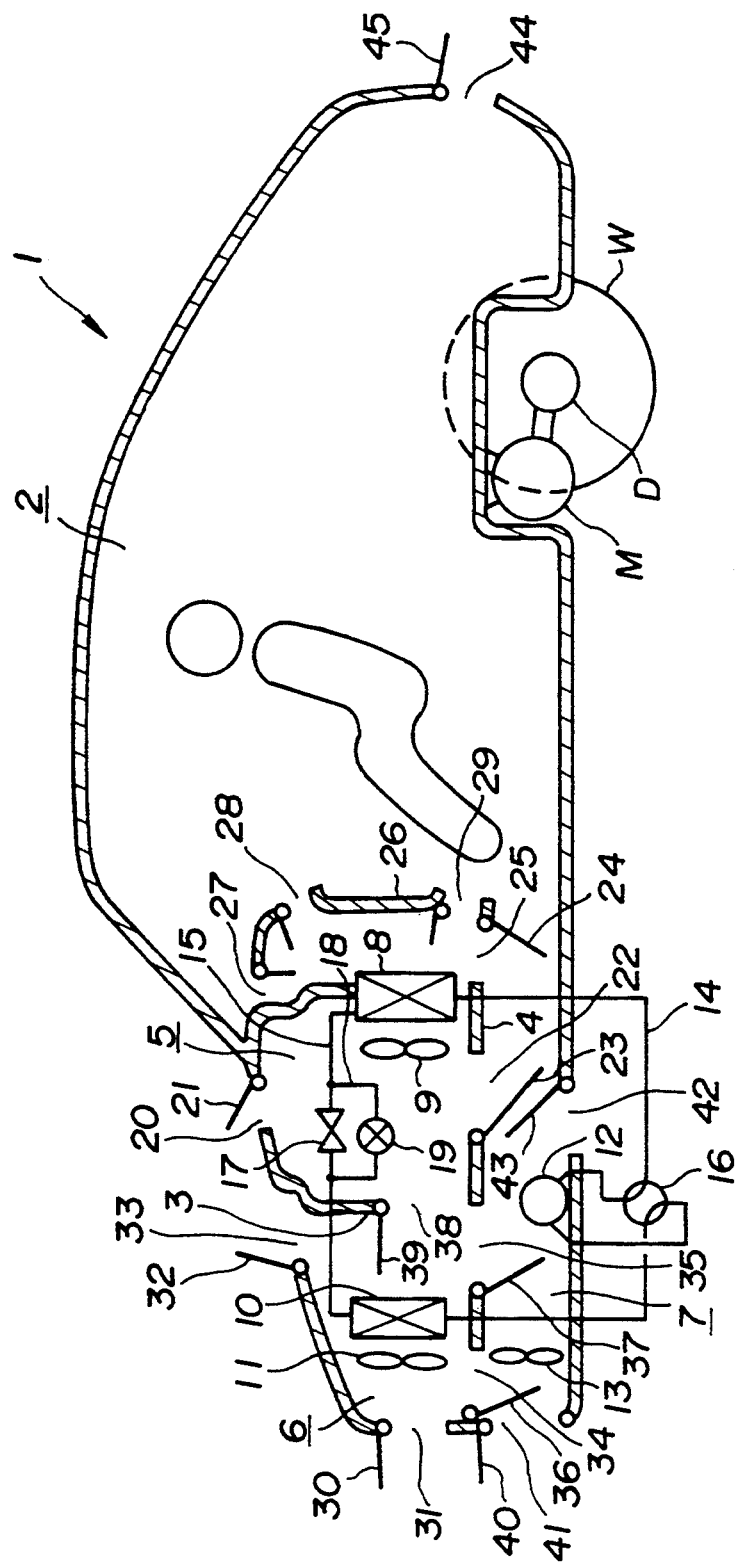
FIG. 1 is a schematic diagram illustrating the construction of one embodiment of an air-conditioner system for a vehicle according to the present invention.

FIG. 1 is a schematic diagram illustrating the construction of one embodiment of an air-conditioning system for a vehicle according to the present invention.

As can be seen from FIG. 1, no internal combustion engine is mounted in the vehicle 1. The vehicle 1 is an electromobile in which a battery (not shown) as a power source is properly accommodated in a lower portion or a rear portion of the vehicle body. An electric motor M is mounted in the lower rear portion of vehicle 1 and, through an appropriate transmission mechanism (unnumbered), drives differential D for driving the rear wheels W of the vehicle. The electric motor M is separate from passenger compartment 2 and air-conditioning system whereby it does not influence the air-conditioning operation. There is space in front of the passenger compartment 2 for the air-conditioning system. The space is divided into three chambers 5, 6 and 7 by a vertical partition 3 and a horizontal partition 4.

An interior heat exchanger 8 and an interior electric fan 9 for blowing air through the heat exchanger 8 are mounted in the first chamber 5 located adjacent the front of the passenger compartment 2. An exterior heat exchanger 10 and an exterior electric fan 11 for blowing air through the heat exchanger 10 are mounted in the second chamber 6 located forwardly adjacent the first chamber 5. Further, a compressor 12, a drive motor (not shown) for the compressor 12 and an electric fan 13 for introducing air into the third chamber 7 are mounted in the third chamber 7 defined below the first and second chambers 5 and 6.

The interior heat exchanger 8 and the exterior heat exchanger 10 are interconnected by two refrigerant pipes 14 and 15. The compressor 12 is connected to one of the refrigerant pipes 14 through a four-way valve 16. Thus, a refrigerant compressed by the compressor 12 can be introduced to either the interior heat exchanger 8 or the exterior heat exchanger 10 by switching-over of the four-way valve 16. That is, in this embodiment, a switchover means for switching-over the direction of flow of the refrigerant is comprised of the four-way valve 16.

An expansion valve 17 as a depressurizing means for depressurizing the refrigerant is mounted in the other refrigerant pipe 15. The expansion valve 17 comprises a fine tube, called a capillary tube, and is of a reversible type for likewise depressurizing the refrigerant flowing to either heat exchanger.

In this way, a heat pump cycle is constructed by the interior heat exchanger 8, the exterior heat exchanger 10, the compressor 12, the refrigerant pipes 14 and 15, the four-way valve 16 and the expansion valve 17.

Further, a bypass pipe 18 bypassing the expansion valve 17 is connected to the refrigerant pipe 15 having the expansion valve 17 provided therein. An on-off valve 19 is mounted in the bypass pipe 18. Thus, when the on-off valve 19 is opened, the refrigerant flows through bypass pipe 18 to bypass the expansion valve 17.

An open-air intake port 20 for introducing the open air is provided in that upper wall of the first chamber 5 which faces to the outside of the vehicle. The open-air intake port 20 is adapted to be opened and closed by an open-air introducing damper 21. The horizontal partition 4 has an inside-air introducing port 22 provided in its front portion forming a bottom surface of the first chamber 5 for introducing air from the compartment 2. The inside-air introducing port 22 is adapted to be opened and closed by an inside-air circulating damper 23 capable of being swung downwardly. When the inside-air circulating damper 23 is opened, the compartment 2 and the third chamber 7 are partitioned from each other. Further, the horizontal partition 4 has a port 25 provided at its rear portion, i.e., at its side closer to the compartment, adapted to be opened and closed by a damper 24. The damper 24 is adapted to shut-off the air flowing from the compartment 2 to the inside-air introducing port 22 in the first chamber 5, when the port 25 is opened. That is, a shield means for shutting-off the first chamber 5 from the compartment 2 is constructed by the damper 24.

As is the case with a conventional vehicle, an instrument panel 26 forming the wall surface of the first chamber 5 facing to the compartment 2 has air discharge ports 27, 28 and 29 provided in a top surface thereof and upper and lower portions thereof, respectively. The air discharge ports 27, 28 and 29 can also be selectively opened and closed.

Thus, the air outside the vehicle or within the compartment 2 is introduced through the open-air intake port 20 or the inside-air introducing port 22 into the first chamber 5 and subjected to heat exchange with the interior heat exchanger 8. Thereafter, such air is introduced through the air discharge ports 27, 28 and 29 into the compartment 2.

An open-air introducing port 31 is provided in a front surface of the second chamber 6 and adapted to be opened and closed by an open-air introducing damper 30. An air discharge port 33 is provided in an upper surface of the second chamber 6 at a rear portion thereof and adapted to be opened and closed by a discharge damper 32. Further, the horizontal partition 4 forming a bottom surface of the second chamber 6 and located between the second and third chambers 6 and 7 has ports 34 and 35 provided, respectively, at locations forward and rearward of the exterior heat exchanger 10 placed in the second chamber 2 for circulating the air in the third chamber 7 through the heat exchanger 10. The ports 34 and 35 are also adapted to be opened and closed by dampers 36 and 37, respectively.

The vertical partition 3 between the first and second chambers 5 and 6 is provided with a port 38 which permits the communication between both the chambers 5 and 6. The port 38 is adapted to be opened and closed by a ventilation damper 39.

A cooling air intake port 41 is also provided in a front surface of the third chamber 7 and adapted to be opened and closed by an open-air introducing damper 40. A heat discharge port 42 is provided in the third chamber 7 at a location rearward of the compressor 12 for discharging the air heated by the compressor 12 or the drive motor therefor to the outside of the vehicle. The heat discharge port 42 is adapted to be opened and closed by a heat discharge damper 43 which is swingable upwardly.

A ventilation port 44 is provided at a rear portion of the compartment 2 for discharging the air in the compartment 2 to the outside of the vehicle. The ventilation port 44 is also adapted to be opened and closed by a ventilation damper 45.

The operation of the vehicle air-conditioning system constructed in the above manner will be described below in connection with FIGS. 2–9 that each show a different mode of operation but in which the electric drive motion M, differential D and wheels W have been omitted as being unnecessary to a description or understanding of the modes of operation.

a) Air cooling

Figure 2:
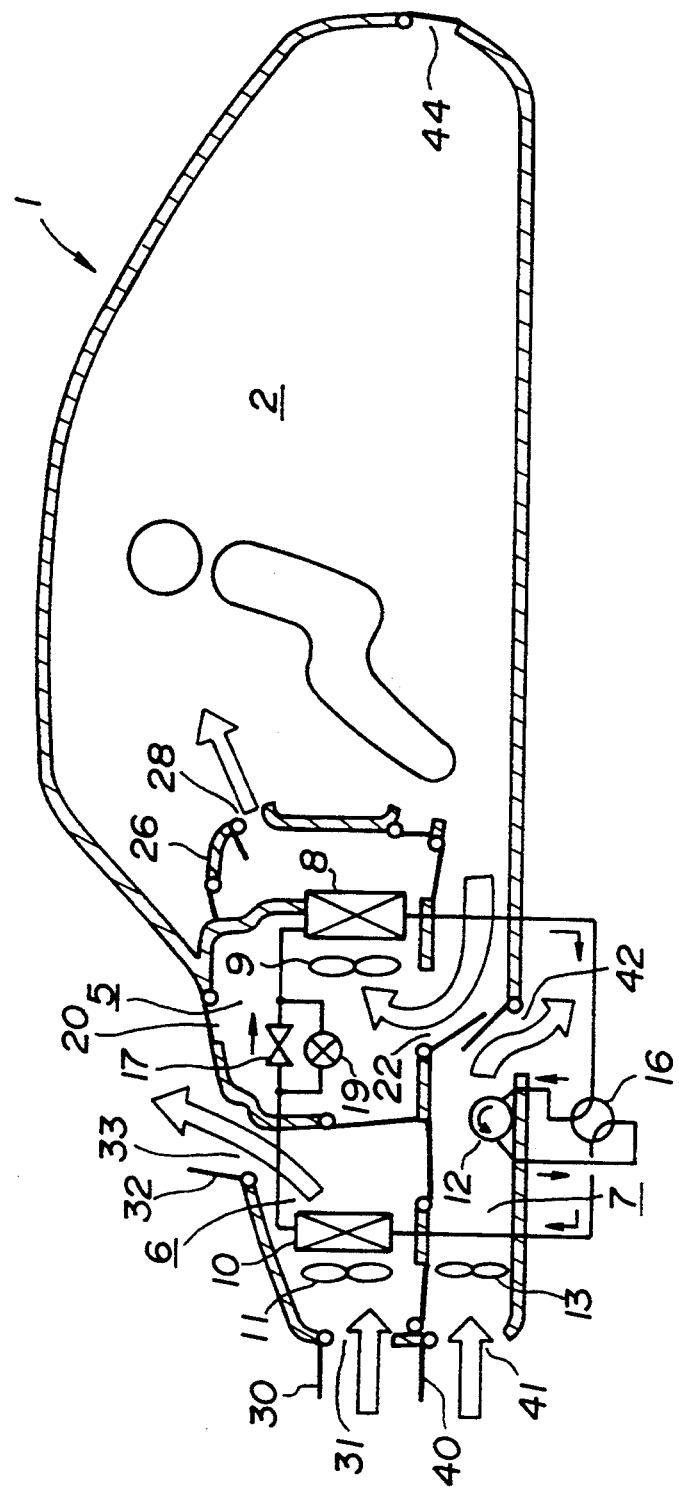
FIG. 2 is a diagram illustrating one form of a air-cooling mode in the air-conditioner system.

In carrying out the air cooling for the compartment 2, the four-way valve 16 is switched over, so that the refrigerant compressed by the compressor 12 is conducted into the exterior heat exchanger 10, as shown in FIG. 2. Then, the inside-air introducing port 22 in the first chamber 5, the air discharge port 28 in the upper portion of the instrument panel 26, and the open-air introducing port 31 and the air discharge port 33 in the second chamber 6 are opened. The cooling air intake port 41 and the heat discharge port 42 in the third chamber 7 are also opened. The other ports are left closed. The on-off valve 19 in the bypass pipe 18 is normally closed.

In this condition, the compressor 12 and the electric fans 9, 11 and 13 are driven. In doing so, a gas-phase refrigerant compressed by the compressor 12 to a high temperature and a high pressure is conducted into the exterior heat exchanger 10 within the second chamber 6, where it is cooled by heat exchange with the open air introduced into the second chamber 6. As a result, such refrigerant becomes a high pressure liquid. The air heated to a high temperature by heat-exchange with the refrigerant is discharged through the air discharge port 33. Then, that refrigerant is conducted through pipe 15 and depressurized by the expansion valve 17 into an easily-evaporatable state and supplied to the interior heat exchanger 8 within the first chamber 5. In the interior heat exchanger 8, the refrigerant is vaporized by the rapid expansion while absorbing a heat from the surroundings. Thus, the air introduced from the inside of the compartment 2 through the inside-air introducing port 22 and then blown through the interior heat exchanger 8 by fan 9 is cooled. Then, the cooled air is passed through the air discharge port 28 back into the compartment 2. The refrigerant heated to a higher temperature by absorbing heat from the air supplied into the compartment 2 is conducted again into the compressor 12, where it is compressed.

The air cooling in the compartment 2 is carried out by circulating the air in the compartment 2 through the interior heat exchanger 8 in this manner. The temperature in the compartment 2, i.e., the temperature of the air supplied into the compartment 2 is controlled by the speed of operation of the compressor 12 and the amount of air fed by the interior electric fan 9.

If the open-air intake port 20 in the first chamber 5 is opened at such time, air introduced from outside of the vehicle can be cooled and supplied into the compartment 2. If the ventilation port 44 at the rear portion of the compartment 2 is opened at that time, an air-cooling mode involving the ventilation of the compartment 2 is established.

Figure 10:
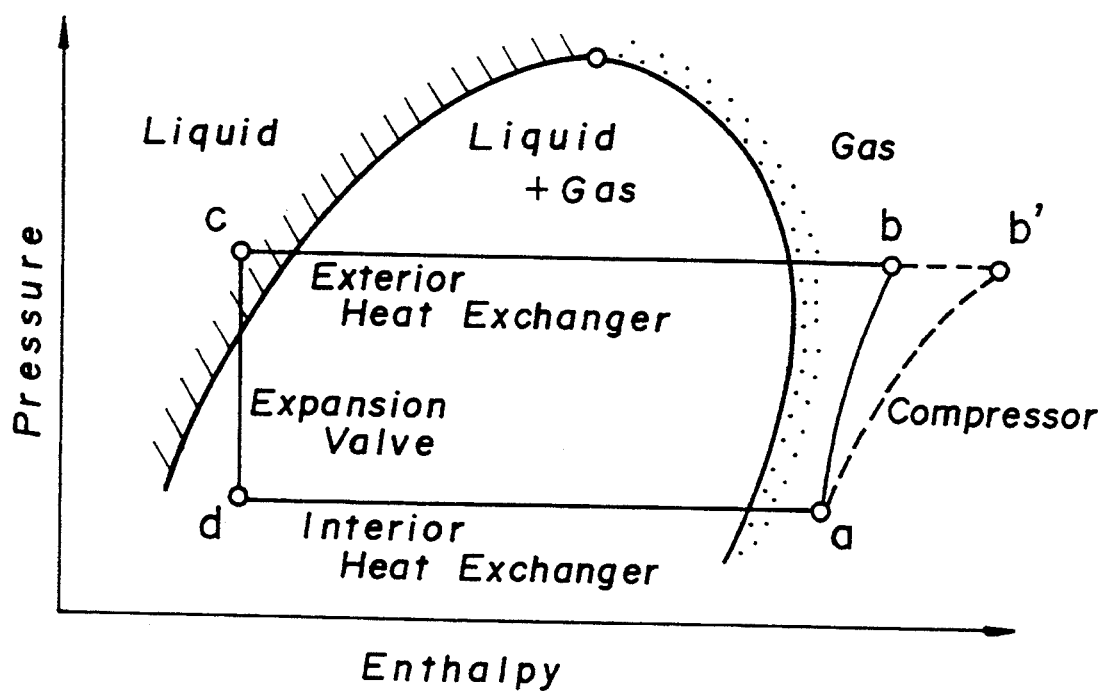
FIG. 10 is a Mollier diagram of a refrigerating cycle for explaining the effect of the air-conditioner system according to the present invention.

It should be noted that during such time, the compressor 12 and the drive motor therefor are located within the independent third chamber 7. The cooling air is introduced from outside of the vehicle into the third chamber 7. Thus, the compressor 12 is cooled directly by such cooling air, wherein this cooling is carried out effectively. As a result, the increase in the temperature of the refrigerant caused upon compression thereof is minimized. More specifically, the temperature of the refrigerant is only increased from a point a to a point b in the Mollier diagram shown in FIG. 10 and hence, the work done by the compressor 12 is reduced, as compared with a system in which the temperature is increased to a point b' as in the prior art. This leads to an enhanced efficiency of the compressor 12. In addition, it is only required for the exterior heat exchanger 10 to lower the temperature of the refrigerant from the point b to a point c and hence, a reduction in the size of the heat exchanger 10 can be achieved. Moreover, since the exterior heat exchanger 10 is placed in the second chamber 6 partitioned from the third chamber 7 in which the compressor and the drive motor therefor are placed, it cannot be influenced by radiant heat from the compressor 12 or the like. This provides an enhanced efficiency of the exterior heat exchanger 10 and enables a reduction in size thereof.

b) Air heating

Figure 3:
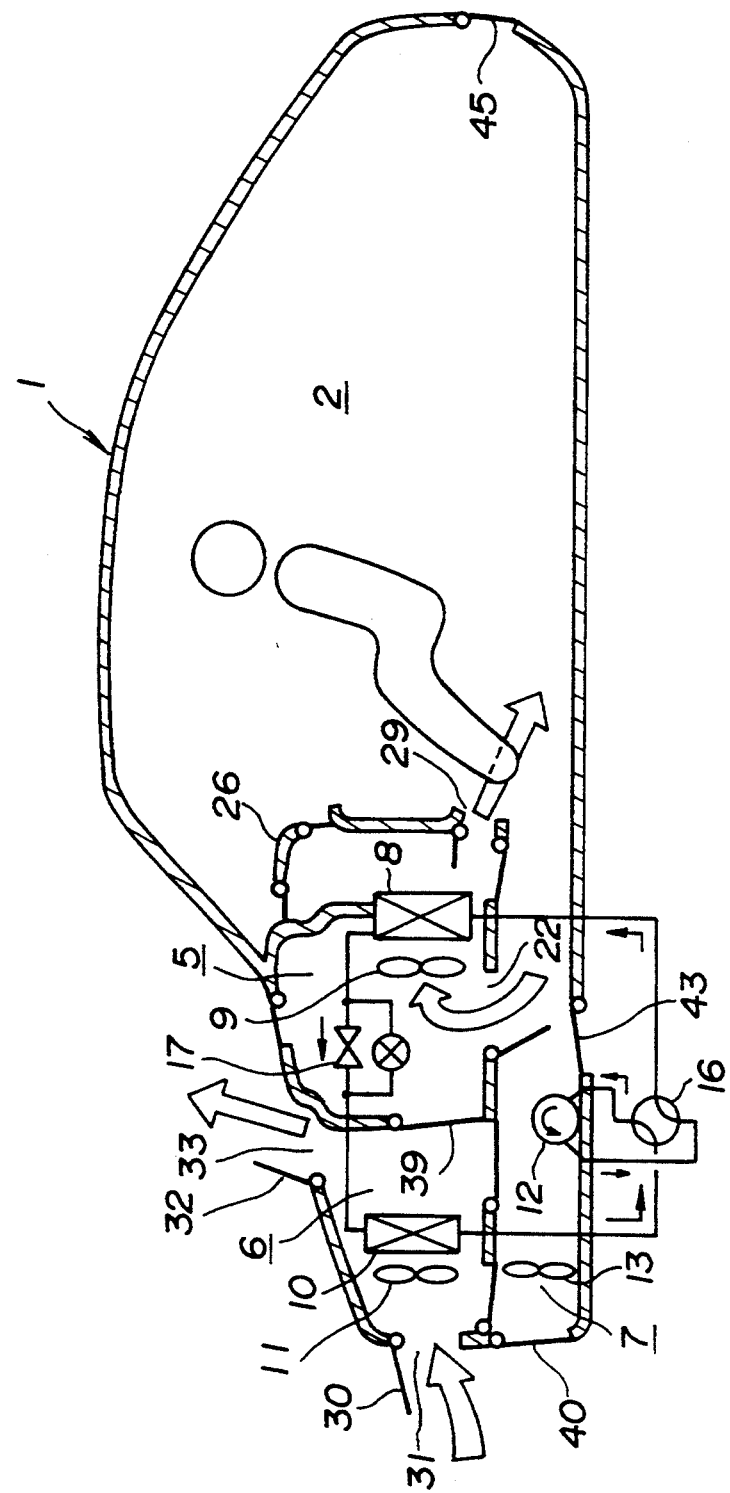
FIG. 3 is a diagram illustrating one form of a air-heating mode in the air-conditioner system.

In carrying out the air heating of the compartment 2, the four-way valve 16 is switched over, so that the refrigerant compressed by the compressor 12 is conducted into the interior heat exchanger 8, as shown in FIG. 3. Then, the inside-air introducing port 22 in the first chamber 5, the air discharge port 29 at the lower portion of the instrument panel 26, and the open-air introducing port 31 and the air discharge port 33 in the second chamber 6 are opened. The other ports are left closed.

In this condition, the compressor 12 and the electric fans 9, 11 and 13 are driven. In doing so, a gas-phase refrigerant compressed by the compressor 12 to a high temperature and a high pressure is conducted into the interior heat exchanger 8 within the first chamber 5, where it is subjected to heat exchange with the air introduced into the first chamber 5 and present in the compartment 2. Thus, such air is heated. Then, the air heated to a higher temperature in this manner is returned through the air discharge port 29 into the compartment 2. The refrigerant subjected to the heat exchange with the air in the compartment is cooled into a high pressure liquid and depressurized by the expansion valve 17. Thereafter, such refrigerant is passed into the exterior heat exchanger 10 within the second chamber 6. Then, the refrigerant is subjected to heat exchange with the open air blown through the exterior heat exchanger 10, whereby the refrigerant is vaporized by absorption of heat from such open air. Subsequently, the refrigerant is passed again into the compressor 12, where it is compressed. The air cooled to a low temperature by the heat exchange with the refrigerant in the exterior heat exchanger 10 is discharged through the air discharge port 33 in the second chamber 6 to the outside of the vehicle.

In this manner, the air heating of the compartment 2 is carried out by reversing the heat pump cycle from the air cooling cycle to circulate the air in the compartment 2 through the interior heat exchanger 8, while releasing the heat from the interior heat exchanger 8. In this case, the third chamber 7 having the compressor 12 located therein is shielded from the outside. Therefore, the temperature in the third chamber 3 is increased to a higher level by generation of heat from the compressor 12 and the drive motor therefor. The heat in the third chamber 7 is applied to the refrigerant flowing through the compressor 12. As a result, the temperature of the refrigerant at the time when it is compressed by the compressor 12 is increased, leading to an enhanced air-heating efficiency.

Figure 4:
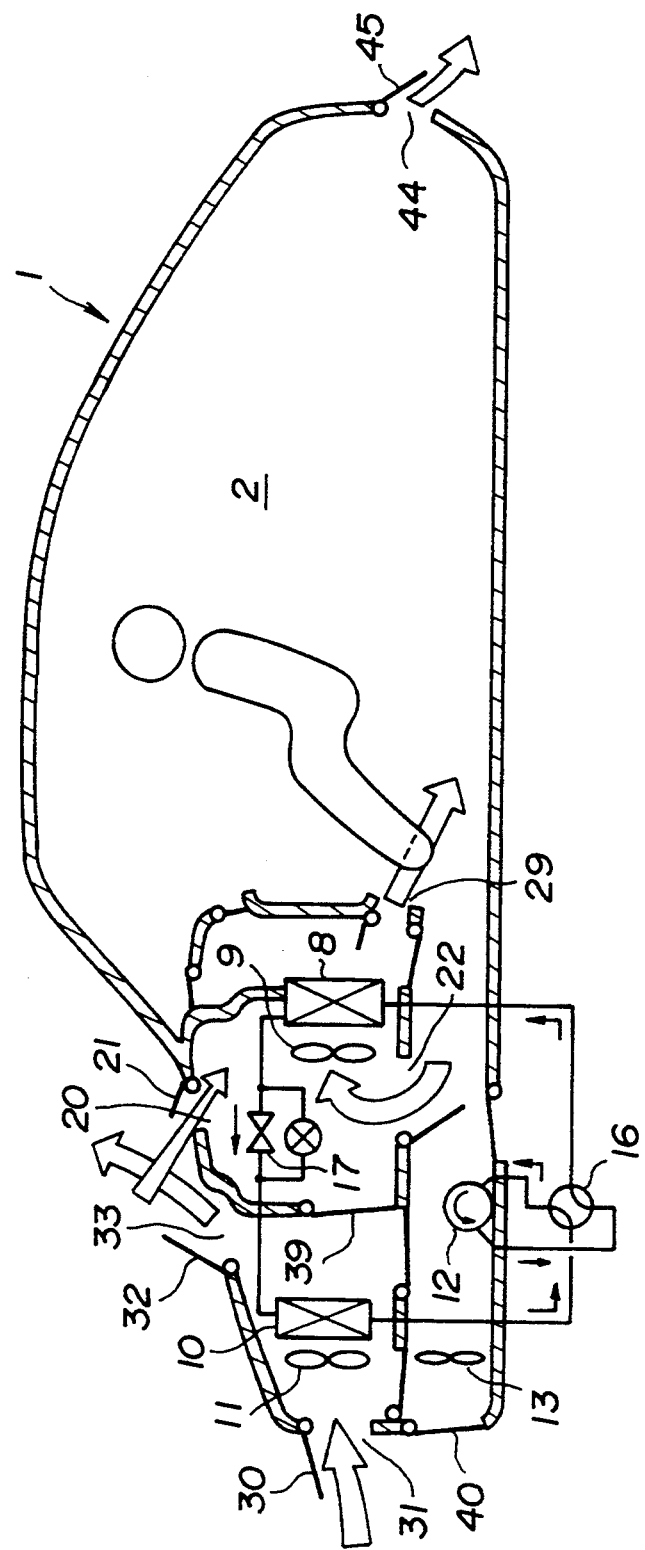
FIG. 4 is a diagram illustrating a different form of the air-heating mode in the air-conditioner system.

In the air heating mode, the air-conditioning system can be operated with both the open-air intake port 20 in the first chamber 5 and the ventilation port 44 at the rear portion of the compartment 2 being half-opened, as shown in FIG. 4. In doing so, the ventilation of the compartment 2 is carried out simultaneously with the air heating of the compartment.

c) Ventilation

Figure 5:
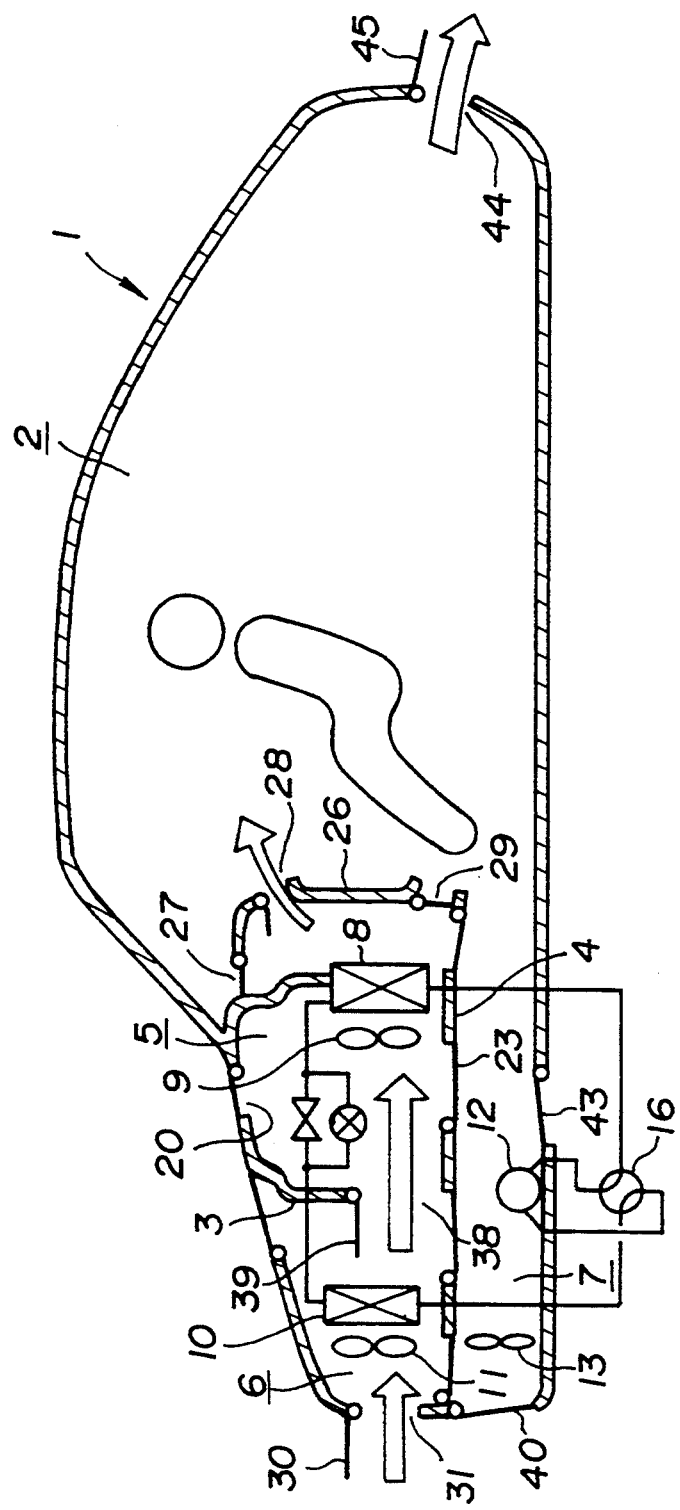
FIG. 5 is a diagram illustrating one form of a ventilating mode in the air-conditioner system.

When only the ventilation of the compartment 2 is to be carried out, the compressor 12 is stopped to stop the heat pump cycle. Then, the open-air introducing port 31 in the second chamber 6, the port 38 provided in the vertical partition 3 between the first and second chambers 5 and 6, the air discharge port 28 in the upper portion of the instrument panel 26 and the ventilation port 44 at the rear portion of the compartment are opened, as shown in FIG. 5. The air discharge port 27 in the top surface of the instrument panel 26 may be also opened.

During travelling of the vehicle 1, the electric fans 9, 11 and 13 are left stopped. During stoppage of the vehicle 1, only the interior electric fan 9 and the exterior electric fan 11 are driven.

In doing so, during travelling of the vehicle 1, running wind flows through the open-air introducing port 31 at the front end into the second chamber 6 and then through the port 38 provided between the first and second chambers 5 and 6 via the first chamber 5 into the compartment 2. Then, the air in the compartment 2 exits the compartment 2 through ventilation port 44 at the rear portion thereof. Thus, the ventilation of the compartment 2 is carried out. The air flow during this time is controlled by the port degree of the open-air introducing damper 30 adapted to open and close the open-air introduction port 31.

During stoppage of the vehicle 1, the open air is taken in through the open-air introduction port 31 by means of the exterior electric fan 11 and supplied into the compartment 2 by means of the interior electric fan 9. Thus, the ventilation of the compartment 2 is carried out in a similar manner. The air flow during this time is controlled by the number of revolutions per minute of the electric fans 9 and 11.

In this case, the inside-air introduction port 22 in the first chamber 5 is closed by the inside-air ventilation damper 23, so that the compartment 2 is put into communication with the third chamber 7 accommodating the compressor 12. However, the compressor 12 is stopped at this time and hence, the inside of the third chamber 7 cannot be increased to a high temperature, and any influence cannot be exerted to the temperature in the compartment 2. When the air-conditioning system is to be shifted to the ventilation mode immediately after the compressor 12 has been driven for a long period of time, the cooling air intake port 41 and the heat discharge port 42 in the third chamber 7 may be maintained opened.

If a slight ventilation will suffice, then the open-air intake port 20 in the first chamber 5 can be opened, so that the open air can be introduced through the open-air intake port 20.

d) Dehumidification

Figure 6:
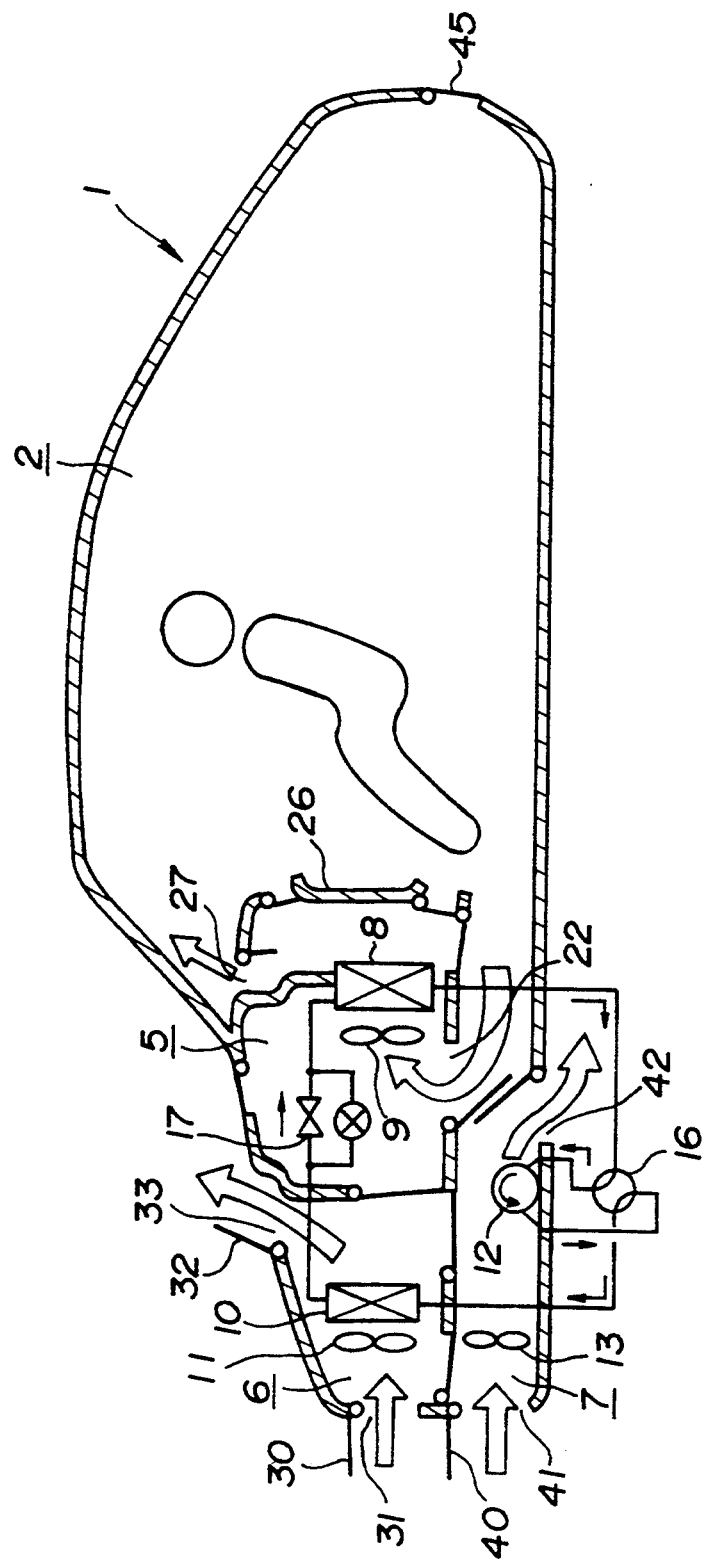
FIG. 6 is a diagram illustrating one form of a dehumidifying mode in the air-conditioner system.

When the humidity in the compartment 2 is increased such that the windshield or the like is clouded up, the air-conditioning system is operated in a dehumidifying mode. Two operational conditions are included in the dehumidifying mode. One is an operational condition in a weakly air-cooling mode, as shown in FIG. 6. More specifically, the four-way valve 16 is switched over, so that the refrigerant compressed by the compressor 12 flows to the exterior heat exchanger 10. Then, the inside-air introduction port 22 in the first chamber 5, the open-air introduction port 31 and the air discharge port 33 in the second chamber 6, and the cooling-air intake port 41 and the heat discharge port 42 in the third chamber 7 are opened. At this time, the air discharge port 27 in the top surface of the instrument panel 26 is also opened.

In this condition, the compressor 12 and the electric fans 9, 11 and 13 are driven at a low speed. In doing so, the air passed from the compartment 2 into the first chamber 5 is cooled by the interior heat exchanger 8 in the same manner as during the air-cooling. The water in the air is condensed by such cooling. Thus, the air blown through the air discharge port 27 in the top surface of the instrument panel 26 into the compartment 2 is a relatively dried air. In this way, the dried air is blown against the windshield to remove the clouding of the windshield.

Figure 7:
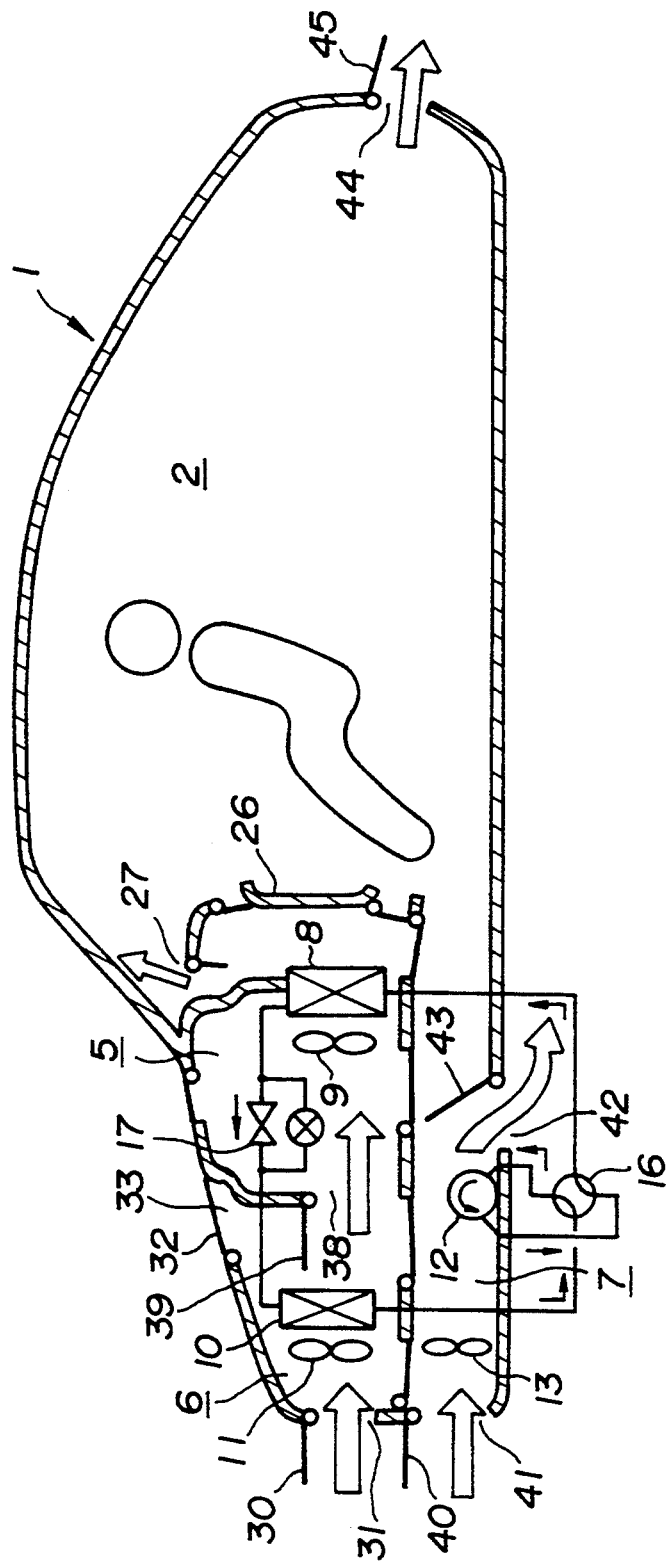
FIG. 7 is a diagram illustrating a different form of the dehumidifying mode in the air-conditioner system.

In this dehumidifying mode, however, the air supplied into the compartment 2 is cooled to a certain extent. Thus, when it is not preferable to blow cool air into the compartment 2, the air-conditioning system is operated in a manner as shown in FIG. 7.

More specifically, the four-way valve 16 is switched over, so that the refrigerant compressed by the compressor 12 flows to the interior heat exchanger 8, thereby bringing the heat pump cycle into the air-heating mode. Then, the air discharge port 33 in the second chamber 6 is closed, while the port 38 between the second chamber 6 and the first chamber 5 is opened. The ventilation port 44 at the rear portion of the compartment 2 is also opened.

In doing so, the open air introduced through the open-air introduction port 31 in the second chamber 6 is first cooled and dehydrated by the exterior heat exchanger 10. Then, such dried air flows through the port 38 into the first chamber 5 and is heated by the interior heat exchanger 8. This air then flows through the air discharge port 27 in the top surface of the instrument panel 26 into the compartment 2. On the other hand, air of a high humidity in the compartment 2 is discharged through the ventilation port 44 to the outside of the vehicle.

In this case, unless the rise in temperature of the refrigerant due to the work of the compressor 12 is considered, the amount of heat absorbed by the exterior heat exchanger 10 is theoretically equal to the amount of heat released from the interior heat exchanger 8. The compressor 12 is cooled effectively by the cooling air introduced from the outside of the vehicle into the third chamber 7 and hence, the amount of refrigerant heated by the compressor 12 is small. Thus, the temperature of the air heated by the interior heat exchanger 8 and supplied into the compartment 2 is maintained substantially at the temperature of the open air introduced.

In this manner, the dried air having a temperature substantially equal to the temperature of the open air is supplied into the compartment 2 to dehumidify the compartment 2.

e) Ice-Thawing or Defrosting

Figure 8:
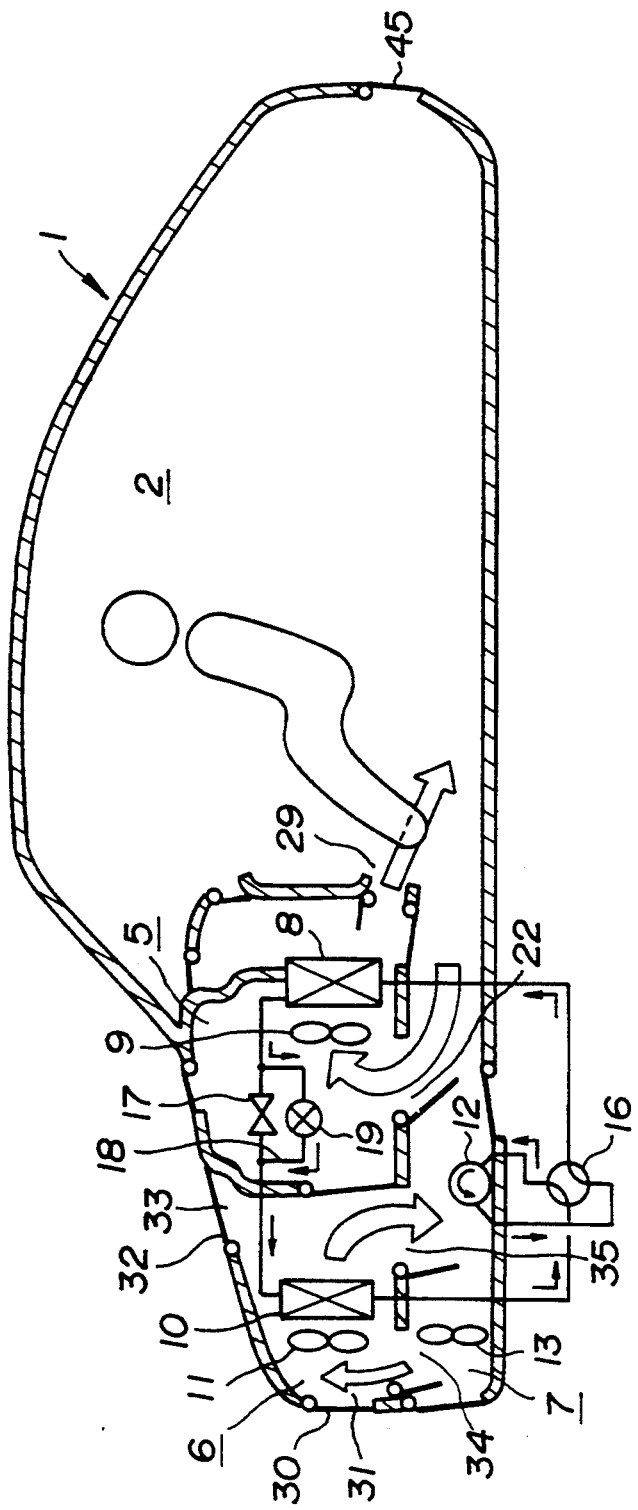
FIG. 8 is a diagram illustrating one form of an ice-thawing or defrosting mode in the air-conditioner system.

Air heating is conducted when the temperature of the open air is lower than the modes of operation shown in FIGS. 6 and 7. As described above, the absorption of heat is performed in the exterior heat exchanger 10 during operation in the air heating mode. Specifically, the open air blown through the heat exchanger 10 is reduced in heat by vaporization of the refrigerant. Thus, the surroundings around the exterior heat exchanger 10 are brought into a further lower temperature than the temperature of the open air. For this reason, frost or ice may be produced on the exterior heat exchanger 10. If the ice is deposited on the heat exchanger 10 in this manner, the efficiency of the heat exchanger 10 is significantly reduced. In such an event, the air-conditioning system is operated in the following manner:

First, the refrigerant is permitted to flow in the same direction as in the air heating mode, as shown in FIG. 8. More specifically, the four-way valve 16 is left shifted so that the refrigerant compressed by the compressor 12 flows to the interior heat exchanger 8. On the other hand, the open-air introduction port 31 and the air discharge port 33 in the second chamber 6 are closed. Instead, the ports 34 and 35 between the second and third chambers 6 and 7 are opened. In this case, the on-off valve 19 mounted in the bypass pipe 18 is opened.

In this condition, the interior electric fan 9 is operated at a low speed. In doing so, the amount of air heat-exchanged with the refrigerant in the interior heat exchanger 8 is suppressed to the minimum. Therefore, the refrigerant is maintained at a relatively high temperature, even after it has passed through the heat exchanger 8. Then, the refrigerant flows through the bypass pipe 18 bypassing the expansion valve 17 into the exterior heat exchanger 10. Thus, the refrigerant at the relatively high temperature and under a relatively high pressure is passed into the exterior heat exchanger 10. The air of a relatively high temperature heated by generation of a heat by the compressor 12 and the drive motor and present in the third chamber 7 is also blown through the exterior heat exchanger 10 by the exterior electric fan 11. As a result, the ice deposited on the exterior heat exchanger 10 is thawed.

During this time, the air blown to the interior heat exchanger 8 is of a small amount, because of a low number of revolutions per minute of the interior electric fan 9, but is at least heated by the heat exchanger 8. Then, such air is supplied into the compartment 2. Thus, the inside of the compartment 2 does not come to be heated excessively, but is at least prevented from being reduced in temperature. In this manner, the ice-thawing or defrosting of the exterior heat exchanger 10 is carried out with the temperature in the compartment 2 being maintained.

Figure 9:
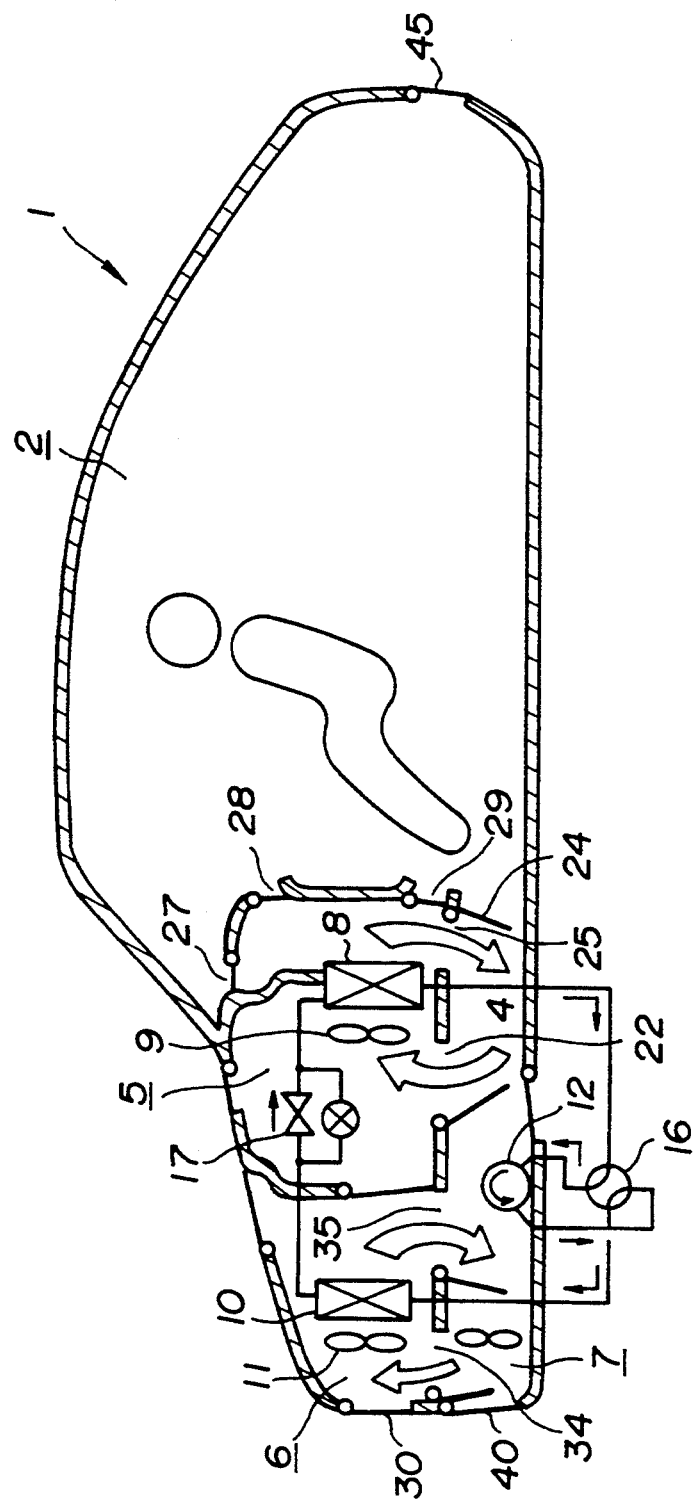
FIG. 9 is a diagram illustrating a different form of the ice-thawing or defrosting mode in the air-conditioner system.

If the ice-thawing or defrosting of the exterior heat exchanger 10 is impossible even in this mode, then the four-way valve 16 is switched over, as shown in FIG. 9, to operate the heat pump cycle in the air-cooling mode. In this case, in order to ensure that the air cooled by the interior heat exchanger 8 cannot flow into the compartment 2, all the air discharge ports 27, 28 and 29 for blowing the air from the first chamber 5 into the compartment 2 are closed, while the port 25 provided adjacent the compartment 2 in the partition 4 forming the bottom wall of the first chamber 5 is opened. Then, the first chamber 5 is shut off from the compartment 2 by the damper 24 for closing the port 25, so that the air passed through the interior heat exchanger 8 flows from the port 25 and is then returned again to the first chamber 5 through the inside-air introduction port 22. Therefore, an occupant is prevented from feeling any cold air.

The operation of the heat pump cycle in the air cooling mode in this manner ensures that the refrigerant releases heat in the exterior heat exchanger 10, so that the surroundings around the heat exchanger 10 are brought into a high temperature. Even during this time, the air heated to a high temperature in the third chamber 7 by releasing of the heat from the compressor 12 and the like is circulated between the third chamber 7 and the second chamber 6, so that the warm air is blown through the heat exchanger 10. As a result, the ice deposited on the exterior heat exchanger 10 is thawed rapidly.

In this manner, even when frost or ice is produced on the exterior heat exchanger 10, the frost or ice can be removed by utilizing the heat discharged from the heat pump cycle, the compressor 12 and the like.

Although the air-conditioning system using the four-way valve 16 as the switchover means for switching over the direction of flow of the refrigerant has been described in the above embodiment, it will be understood that if the compressor 12 is replaced by a reversible compressor 12 as disclosed in Japanese Patent Application Laid-open No. 8588/80, such four-way valve 16 can be eliminated.

It will be also understood that in addition to the single expansion valve 17 comprising the capillary tube as in the above-described embodiment, an arrangement independently comprising an expansion valve adapted to be operated in the air-cooling cycle and an expansion valve adapted to be operated in the air-heating cycle can be used as the depressurizing means for depressurizing the refrigerant.

Further, although the third chamber 7 in which the compressor 12 is placed is disposed below the first and second chambers in the above-described embodiment, the third chamber 7 can be disposed, for example, sideways of the first and second chambers. In addition, if the mode used may be limited, then the first, second and third chambers 5, 6 and 7 can be disposed at positions spaced apart from one another.

As apparent from the foregoing description, according to the present invention, the compressor is disposed in the independent third chamber which is partitioned from the first chamber in which the interior heat exchanger is disposed and the second chamber in which the exterior heat exchanger and also from the passenger compartment. Therefore, the interior heat exchanger, the exterior heat exchanger and the compressor are not thermally influenced by one another, except when desired, and particularly during air-cooling, the radiant heat from the heat generating source such as the compressor is prevented from influencing the exterior heat exchanger, leading to an enhanced efficiency of the exterior heat exchanger. Therefore, it is possible to provide a reduction in size of the exterior heat exchanger.

In addition, the compressor disposed in the third chamber is cooled efficiently by introducing separate cooling air into the third chamber and therefore, the efficiency of the compressor also can be enhanced. Moreover, this enables a reduction in amount of heat released from the exterior heat exchanger during air-cooling, thereby providing a further reduction in size of the exterior heat exchanger.

By the ability to properly put the first, second and third chambers into and out of communication with one another and further the ability to properly put these chambers and the outside of the vehicle or the passenger compartment into and out of communication with each other, and by effecting the heat pump cycle, it is possible to operate the air-conditioner system in the various modes of not only air-cooling and heating and ventilation but also dehumidification and ice-thawing or defrosting, and it is possible to always maintain the inside of the compartment at a comfortable environment.

What is claimed is;

1. An air-conditioning system for a vehicle, comprising an interior heat exchanger disposed in a first chamber for heat exchange with air introduced into the first chamber, said first chamber having an inside-air introduction port for admitting air from a vehicle passenger compartment into the first chamber and an air discharge port for discharging the air into the compartment, an exterior heat exchanger disposed in a second chamber for heat exchange with air introduced into the second chamber, said second chamber having an open air introduction port for admitting air from outside of the vehicle into the second chamber and an air discharge port for discharging the air to outside of the vehicle, a compressor mounted in communication with one of two refrigerant pipes for compressing a refrigerant, said two refrigerant pipes being connected to said heat exchangers for circulating the refrigerant between said interior and exterior heat exchangers, and a depressurizing means mounted in the other refrigerant pipe for depressurizing said refrigerant flowing between said interior and exterior heat exchangers, wherein said compressor is disposed in a third chamber which is partitioned from said first and second chambers and said compartment, and said third chamber having a cooling air-intake port for admitting air directly from outside of the vehicle into the third chamber and a heat discharge port for discharging the air to outside of the vehicle.

2. An air-conditioning system for a vehicle according to claim 1, wherein said cooling-air intake port is provided with means for opening and closing for admitting compressor-cooling air from outside of the vehicle into said third chamber, and said heat discharge port is provided with means for opening and closing for discharging the air heated in said third chamber to outside of the vehicle.

3. An air-conditioning system for a vehicle according to claim 1 or 2, wherein said first chamber is provided with an open-air intake port with means for opening and closing for admitting air from outside of the vehicle into said first chamber, said air being heat-exchanged by said interior heat exchanger and supplied into the compartment.

4. An air-conditioning system for a vehicle according to claim 1 or 2, wherein said inside-air introduction port provided in said first chamber and said air discharge port provided in said second chamber include means for opening and closing,
said first chamber is disposed in a front portion of the compartment, and said second chamber is disposed adjacent and in front of said first chamber, and
said system further comprises a partition for partitioning said first and second chambers from each other, said partition being provided with a port with means for opening and closing for guiding the air passed through the exterior heat exchanger within said second chamber to the interior heat exchanger within said first chamber.

5. An air-conditioning system for a vehicle according to claim 1 or 2, wherein said depressurizing means is of a reversible type with means for depressurizing the refrigerant flowing in either direction between the interior and exterior heat exchangers, and
said system further includes a switchover means mounted in said one refrigerant pipe having said compressor mounted in communication therewith for switching over the direction of flow of said refrigerant.

6. An air-conditioning system for a vehicle according to claim 3, wherein said depressurizing means is of a reversible type with means for depressurizing the refrigerant flowing in either direction between the interior and exterior heat exchangers, and
said system further includes a switchover means mounted in said one refrigerant pipe having said compressor mounted in communication therewith for switching over the direction of flow of said refrigerant.

7. An air-conditioning system for a vehicle according to claim 4, wherein said depressurizing means is of a reversible type with means for depressurizing the refrigerant flowing in either direction between the interior and exterior heat exchangers, and
said system further includes a switchover means mounted in said one refrigerant pipe having said compressor mounted in communication therewith for switching over the direction of flow of said refrigerant.

8. An air-conditioning system for a vehicle, comprising
an interior heat exchanger disposed in a first chamber for heat exchange with air introduced into the first chamber, said first chamber having an inside-air introduction port for admitting air from a vehicle passenger compartment into the first chamber and an air discharge port for discharging the air into the compartment,
an exterior heat exchanger disposed in a second chamber for heat exchange with air introduced into the second chamber, said second chamber having an open-air introduction port for admitting air from outside of vehicle into the second chamber and an air discharge port for discharging the air to outside of the vehicle,
a compressor mounted in communication with one of two refrigerant pipes for compressing a refrigerant to feed the refrigerant from said interior heat exchanger to said exterior heat exchanger, said two refrigerant pipes being adapted to circulate the refrigerant between said interior and exterior heat exchangers, and
a depressurizing means mounted in the other refrigerant pipe for depressurizing said refrigerant flowing from said exterior heat exchanger to said interior heat exchanger, wherein
said compressor is disposed in a third chamber partitioned from said first and second chambers and said compartment;
said open-air introduction port and said air discharge port in said second chamber each include means for opening and closing, and a partition for partitioning said second and third chambers from each other is provided with a port with means for opening and closing for circulating the air in said third chamber through the exterior heat exchanger within said second chamber, and
said system further includes a shield means for shutting off said first chamber from said compartment.

9. An air-conditioning system for a vehicle, comprising
an interior heat exchanger disposed in a first chamber for heat exchange with air introduced into the first chamber, said first chamber having an inside-air introduction port for admitting air from a vehicle passenger compartment into the first chamber and an air discharge port for discharging the air into the compartment,
an exterior heat exchanger disposed in a second chamber for heat exchange with air introduced into the second chamber, said second chamber having an open-air introduction port for admitting air from outside of the vehicle into the second chamber and an air discharge port for discharging the air to outside of the vehicle,
a compressor mounted in communication with one of two refrigerant pipes for compressing a refrigerant, said two refrigerant pipes being connected to said heat exchangers for circulating the refrigerant between said interior and exterior heat exchangers, and
a depressurizing means mounted in the other refrigerant pipe for depressurizing said refrigerant flowing between said interior and exterior heat exchangers, wherein
said compressor is disposed in a third chamber partitioned from said first and second chambers and said compartment and adjacent said second chamber,
said open-air introduction port and the air discharge port in said second chamber each include means for opening and closing, and a partition for partitioning said second and third chambers from each other is provided with a port with means for opening and closing for circulating the air in said third chamber through the exterior heat exchanger within said second chamber, and
said depressurizing means is of a reversible type capable of depressurizing the refrigerant flowing in either direction between said interior and exterior heat exchangers, and
said system further includes a switchover means mounted in said one refrigerant pipe having said compressor mounted in communication therewith for switching over the direction of flow of said refrigerant.

10. An air-conditioning system for an electric powered vehicle, comprising
an electric motor and drive means for driving wheels of the vehicle,
an interior heat exchanger disposed in a first chamber for heat exchange with air introduced into the first chamber, said first chamber having an inside-air introduction port for admitting air from a vehicle passenger compartment into the first chamber and an air discharge port for discharging the air into the compartment,
an exterior heat exchanger disposed in a second chamber for heat exchange with air introduced into the second chamber, said second chamber having an open-air introduction port for admitting air from outside of the vehicle into the second chamber and an air discharge port for discharging the air to outside of the vehicle,
a compressor mounted in communication with one of two refrigerant pipes for compressing a refrigerant, said two refrigerant pipes being connected to said heat exchangers for circulating the refrigerant between said interior and exterior heat exchangers, and
a depressurizing means mounted in the other refrigerant pipe for depressuring said refrigerant flowing between said interior and exterior heat exchangers, wherein
said compressor is disposed in a third chamber which is partitioned from said first and second chambers and said compartment, and said electric motor and drive means is disposed at a location separate from said first, second and third chambers and said compartment.

11. An air-conditioning system for a vehicle according to claim 10, wherein said third chamber is provided with a cooling-air intake port with means for opening and closing for admitting compressor-cooling air from outside of the vehicle into said third chamber, and a heat discharge port with means for opening and closing for discharging the air heated in said third chamber to outside of the vehicle.

12. An air-conditioning system for a vehicle according to claim 10, wherein said first, second and third chambers are provided in a front portion of the vehicle and the electric motor and drive means is located in a rear portion of the vehicle and drives rear wheels of the vehicle.

13. An air-conditioning system for a vehicle according to claim 10, 11 or 12, wherein said inside-air introduction port provided in said first chamber and said air discharge port provided in said second chamber each include means for opening and closing,
said first chamber is disposed in a front portion of the compartment, and said second chamber is disposed adjacent and in front of said first chamber, and
said system further comprises a partition for partitioning said first and second chambers from each other, said partition being provided with a port with means for opening and closing for guiding the air passed through the exterior heat exchanger within said second chamber to the interior heat exchanger within said first chamber.

14. An air-conditioning system for a vehicle according to claims 10, 11 or 12, wherein said depressurizing means is of a reversible type with means for depressurizing the refrigerant flowing in either direction between the interior and exterior heat exchangers, and said system further includes a switchover means mounted in said one refrigerant pipe having said compressor mounted in communication therewith for switching over the direction of flow of said refrigerant.

15. An air-conditioning system for a vehicle according to any of claims 1, 2, 8, 9, 10, 11 or 12, wherein a fan is provided in said third chamber, said fan being selectively operable for circulating air passed said compressor.

16. An air-conditioning system for a vehicle according to claim 15 wherein a selectively operable fan is provided in each of the first and second chambers.

17. An air-conditioning system for a vehicle according to any of claims 1, 8, 9 or 10 wherein a bypass pipe is connected to said other refrigerant pipe for bypassing said depressurizing means, and valve means are provided in said bypass pipe for selectively allowing the refrigerant to flow through the bypass pipe.

18. An air-conditioning system for a vehicle according to claim 10, wherein said chamber is provided with ports with selectively operable means for opening and closing each port for selectively either admitting from the outside of the vehicle into said chamber and discharging the air heated in said chamber to outside of the vehicle or admitting air circulating through the exterior heat exchanger into the chamber and discharging that air back to the exterior heat exchanger.

19. An air-conditioning system for a vehicle according to claim 10, wherein
said internal heat exchanger is disposed in a front portion of the vehicle and said external heat exchanger is disposed adjacent and in front of said internal heat exchanger, and
said system further comprises a partition for partitioning means said internal and external heat exchangers from each other, said partition means being provided with a port with means for selectively opening and closing for guiding the air passed through the exterior heat exchanger to the interior heat exchanger.

20. An air-conditioning system for a vehicle according to claim 10 wherein means are provided for selectively circulating air through said interior and exterior heat exchangers and through the chamber passed the compressor.

21. An air-conditioning system for a vehicle according to claim 6 wherein a fan is provided in said third chamber, said fan being selectively operable for circulating air passed said compressor.

22. An air-conditioning system for a vehicle according to claim 21 wherein a selectively operable fan is provided in each of the first and second chamber.

23. An air-conditioning system for a vehicle according to claim 7 wherein a fan is provided in said third chamber, said fan being selectively operable for circulating air passed said compressor.

24. An air-conditioning system for a vehicle according to claim 23 wherein a selectively operable fan is provided in each of the first and second chambers.

25. An air-conditioning system for a vehicle, comprising an interior heat exchanger disposed in a first chamber for heat exchange with air introduced into the first chamber, said first chamber having an inside-air introduction port for admitting air from a vehicle passenger compartment into the first chamber and an air discharge port for discharging the air into the compartment, an exterior heat exchanger disposed in a second chamber for heat exchange with air introduced into the second chamber, said second chamber having an open air introduction port for admitting air from outside of the vehicle into the second chamber and an air discharge port for discharging the air to outside of the vehicle, a compressor mounted in communication with one of two refrigerant pipes for compressing a refrigerant, said two refrigerant pipes being connected to said heat exchangers for circulating the refrigerant between said interior and exterior heat exchangers, and a depressurizing means mounted in the other refrigerant pipe for depressurizing said refrigerant flowing between said interior and exterior heat exchangers, wherein said compressor is disposed in a third chamber which is partitioned from said first and second chambers and said compartment, at least the second chamber having means for being selectively connectable to and disconnectable from said first chamber for adjusting different operational modes.

26. An air-conditioning system for a vehicle, comprising an interior heat exchanger disposed in a first chamber for heat exchange with air introduced into the first chamber, said first chamber having an inside-air introduction port for admitting air from a vehicle passenger compartment into the first chamber and an air discharge port for discharging the air into the compartment, an exterior heat exchanger disposed in a second chamber for heat exchange with air introduced into the second chamber, said second chamber having an open air introduction port for admitting air from outside of the vehicle into the second chamber and an air discharge port for discharging the air to outside of the vehicle, a compressor mounted in communication with one of two refrigerant pipes for compressing a refrigerant, said two refrigerant pipes being connected to said heat exchangers for circulating the refrigerant between said interior and exterior heat exchangers, and a depressurizing means mounted in the other refrigerant pipe for depressurizing said refrigerant flowing between said interior and exterior heat exchangers, wherein said compressor is disposed in a third chamber which is partitioned from said first and second chambers and said compartment, the first chamber having means for being selectively connectable to and disconnectable from the second chamber and the second chamber having means for being selectively connectable to and disconnectable from the third chamber for all three of said chambers to be disconnectable from each other, for establishing different operational modes as heating, cooling, dehumidification and ventilation.

27. An air-conditioning system for a vehicle, comprising an interior heat exchanger disposed in a first chamber for heat exchange with air introduced into the first chamber, said first chamber having an inside-air introduction port for admitting air from a vehicle passenger compartment into the first chamber and an air discharge port for discharging the air into the compartment, an exterior heat exchanger disposed in a second chamber for heat exchange with air introduced into the second chamber, said second chamber having an open-air introduction port for admitting air from outside of the vehicle into the second chamber and an air discharge port for discharging the air to outside of the vehicle, a compressor mounted in communication with one of two refrigerant pipes for compressing a refrigerant, said two refrigerant pipes being connected to said heat exchangers for circulating the refrigerant between said interior and exterior heat exchangers, and a depressurizing means mounted in the other refrigerant pipe for depressurizing said refrigerant flowing between said interior and exterior heat exchangers, wherein said compressor is disposed in a third chamber which is partitioned from said first and second chambers and said compartment and a fan is provided in said third chamber, said fan being selectively operable for circulating air passed said compressor.

28. An air-conditioning system for a vehicle, comprising an interior heat exchanger disposed in a first chamber for heat exchange with air introduced into the first chamber, said first chamber having an inside-air introduction port for admitting air from a vehicle passenger compartment into the first chamber and an air discharge port for discharging the air into the compartment, an exterior heat exchanger disposed in a second chamber for heat exchange with air introduced into the second chamber, said second chamber having an open-air introduction port for admitting air from outside of the vehicle into the second chamber and an air discharge port for discharging the air to outside of the vehicle, a compressor mounted in communication with one of two refrigerant pipes for compressing a refrigerant, said two refrigerant pipes being connected to said heat exchangers for circulating the refrigerant between said interior and exterior heat exchangers, and a depressurizing means mounted in the other refrigerant pipe for depressurizing said refrigerant flowing between said interior and exterior heat exchangers, wherein said compressor is disposed in a third chamber which is partitioned from said first and second chambers and said compartment, and a selectively and separately operable fan is provided in each of said first and second chambers.

29. An air-conditioning system for a vehicle according to claim 28 wherein a separate fan is provided in said third chamber and is selectively operable for circulating air passed said compressor.

* * * * *

UNITED STATES PATENT AND TRADEMARK OFFICE
CERTIFICATE OF CORRECTION

PATENT NO. : 5,341,652

DATED : August 30, 1994

INVENTOR(S) : Tajiri et al.

It is certified that error appears in the above-indentified patent and that said Letters Patent is hereby corrected as shown below:

On the title page, item [75], change "Yoshihko" to --Yoshihiko--.

Signed and Sealed this

Twenty-seventh Day of December, 1994

Attest:

BRUCE LEHMAN

Attesting Officer     Commissioner of Patents and Trademarks